United States Patent [19]

Spath

[11] Patent Number: 4,765,215

[45] Date of Patent: Aug. 23, 1988

[54] DEVICE FOR ADVANCING ROD-SHAPED WORKPIECE MATERIAL IN A CUTTING MACHINE

[75] Inventor: Dieter Spath, Oberachern, Fed. Rep. of Germany

[73] Assignee: Keuro Maschinenbau Gesellschaft mit beschrankter Haftung & Co., Achern-Gamshurst, Fed. Rep. of Germany

[21] Appl. No.: 929,885

[22] Filed: Nov. 13, 1986

[30] Foreign Application Priority Data

Jan. 16, 1986 [DE] Fed. Rep. of Germany ....... 3601075

[51] Int. Cl.$^4$ .................... B23D 55/04; B23D 47/04
[52] U.S. Cl. ........................................ 83/153; 83/160; 83/277; 83/206; 83/282
[58] Field of Search ............... 83/277, 160, 796, 282, 83/409, 206, 153

[56] References Cited

U.S. PATENT DOCUMENTS

| | | | |
|---|---|---|---|
| 3,194,100 | 7/1965 | Fehlberg | 83/277 X |
| 3,504,585 | 4/1970 | Harris | 83/277 X |
| 3,945,282 | 3/1976 | Aizawa | 83/277 X |
| 4,179,961 | 12/1979 | Harris | 83/796 X |
| 4,241,630 | 12/1980 | Moriya | 83/796 X |
| 4,252,040 | 2/1981 | Kiefer | 83/277 X |
| 4,342,240 | 8/1982 | Gaiser et al. | 83/277 X |

FOREIGN PATENT DOCUMENTS 2816497 10/1979 Fed. Rep. of Germany .

Primary Examiner—Donald R. Schran
Attorney, Agent, or Firm—Edwin E. Greigg

[57] ABSTRACT

A device for advancing rod-shaped material in a cutting machine, in which during the cutting operation the material is held by at least one pair of clamping jaws that are arranged in front of the cutting plane in the material advance direction and by a pair of advancing jaws which are arranged after the cutting plane and can be displaced in the material advance direction, of which at least one advancing jaw can be moved transversely to the material advance direction for the purpose of clamping the material and by means of which the workpiece material can be displaced by an amount corresponding to the portion to be cut off and by means of which the severed material can be removed. The arrangement is such that the transversely movable advancing jaw can be displaced beyond the other advancing jaw and that the other advancing jaw can be moved out the corresponding lateral displacement path of the severed material for disposal of the cut piece of material.

26 Claims, 5 Drawing Sheets

DEVICE FOR ADVANCING ROD-SHAPED WORKPIECE MATERIAL IN A CUTTING MACHINE

BACKGROUND OF THE INVENTION

The invention relates to a device for advancing rod-shaped workpiece material in a cutting machine in the form of a hacksaw, circular cold, saw or the like, in which during the cutting operation the material supported on a table of the cutting machine is held by at least one pair of clamping jaws that can be opened and closed and that are immovably arranged in front of the cutting plane in the material advance direction and by a pair of advancing jaws which are arranged after the cutting plane and can be displaced in the material advance direction, with at least one jaw being transversely movable for the purpose of opening and closing, and by means of which, after the separating cut has been made, the severed material can be removed in the material advance direction to a deposition station and by means of which, passing through the cutting plane, the unworked material can be grasped afresh and can be advanced when the clamping jaws are open.

Such a device is known from German Patent Specification No. 28 16 497, in which, in a widely used manner, a feed device for the material is arranged upstream of the table of the cutting machine, this feed device being, for example, in the form of a roller conveyor which also supports the material being worked.

In the case of the known device it was possible, and provision was made, to remove the severed material from the cutting machine with the aid of the advancing jaws, for which purpose each severed piece of material could be transported in the material advance direction by the advancing jaws from the cutting plane to a point, the position of which could be predetermined, where the piece of material could be released and thus deposited. After the advancing jaws had returned to their cutting position in the cutting machine, the piece of material could then be moved from the deposited position to a further processing operation. However, this construction requires the entire device, including the material feed means, the accommodation of which is often possible only with difficulty and is therefore reluctantly accepted, to be of considerable overall length in the material advance direction. On the other hand, it is necessary to supply severed pieces of material, which may be of different sizes, to further processing steps, which may also vary. In the known device, this could be taken into account by the fact that when the material was removed from the cutting machine the pieces of material were moved by the advancing jaws in the material advance direction to different positions from which they could then pass on to various forms of further processing. However this therefore necessitated further enlargement of the device in the material advance direction and in this case, as in the case described above, it was often additionally necessary for material that had been severed and positioned at a distance from the cutting machine to be moved out of the way immediately, for example through the provision of a deposition station of adjustable height, so that there was sufficient space for the material subsequently advanced. This also gave rise to increased expenditure.

The disclosure sets forth a device of the type mentioned at the beginning in such a manner that the removal of material from the cutting machine no longer requires the device to be lengthened in the material advance direction also it does not require the deposition station for the severed material to be of adjustable height. If this construction is retained, however, the severed material may be positioned in such a manner that it lies outside the path of the material in the advance direction. The further development should essentially make use of the existing means of the device and should be capable of being accommodated within the space that is in any case available, that is to say it should be realised without additional space being required and with simple supplementary means.

Starting from a device of the type mentioned at the beginning, this problem is solved according to the invention by the fact that one transversely movable advancing jaw can be displaced beyond the other advancing jaw and that the other advancing jaw can be moved out of this displacement path and out of the corresponding lateral displacement path of the severed material.

As a result of these simple measures it is possible to move each severed piece of material directly sideways, without further movement in the material advance direction, to a space which is in any case available as a result of the customary dimensions of a cutting machine. To this end, it is necessary merely to enlarge the range of movement of the transversely movable advancing jaw in such a manner that, after the transverse displacement of the severed material, the two advancing jaws are again free to move parallel to the material advance direction. In order that the severed material can be moved transversely, the other advancing jaw is removed for a short distance in order to clear the way.

For this purpose, the other advancing jaw can be displaceably arranged on vertical guides. It is equally possible, however, to arrange the other advancing jaw in such a manner that it can be swivelled away either about an axis arranged transversely with respect to the material advance direction or about an axis arranged parallel to the material advance direction, it being advantageous for the other advancing jaw to be pivotable between stops, which may be adjustable.

It has proved to be especially advantageous for the other advancing jaw to be able to swivel upwards, especially in conjunction with a type of construction that is distinguished by the fact that the advancing jaws are displaceably or pivotably arranged on a carriage that extends above and across the material advance path, and that the carriage can be displaced along a guideway that extends parallel to the material advance direction and is arranged on the side of the one, transversely movable advancing jaw remote from the material. There is thus provided a type of construction which can move substantially freely above the surface supporting the material, so that, also in structural terms, it is essentially possible for there to be a separation between the means providing this support surface on the one hand and the carriage for accommodating the advancing jaws, including their adjusting devices, on the other hand.

As is known, the advancing jaws are so arranged or constructed that their vertical edges facing the cutting machine are in alignment transverse to the material advance direction. On the other side of the advancing jaws it has proved advantageous, however, for the clamping surface of the one, transversely movable advancing jaw to be extended in the material advance direction away from the cutting plane. As a result, there is a broad contact surface for the material, especially for effecting its transverse movement, so that the material cannot tilt.

In a further development of the subject of the invention it has proved advantageous for the other advancing jaw to be displaceable into the material advance path by a small amount transverse to the material advance direction. This gives rise to the possibility of using the other advancing jaw simultaneously as a stop and thus for the initial positioning of newly inserted rod material, so that the separate stop that is customarily used for this purpose can be dispensed with.

All the described movements of the advancing jaws on the carriage are advantageously carried out hydraulically by means of cylinder piston units, since the pressure medium required for this purpose is usually in any case available in cutting machines.

Furthermore, it is advantageous for the advancing jaws to be displaceable by means of the carriage in such a manner that, after the material advance, that is to say after the next piece of material to be cut off has been pulled forward, the jaws can be returned to the middle of this piece of material to be cut off and can there be clamped onto the material. As a result, on the one hand this piece of material is held in a favourable position for the cutting operation that is to be carried out and, on the other hand, it is positioned equally favorably for the transverse displacement to be effected after cutting.

In view of this transverse displacement, it is finally advantageous for a material support table adjoining the table of the cutting machine in the material advance direction to be widened at least by an amount corresponding to the amount by which the severed material can be displaced transversely by means of the transversely movable advancing jaw. This widened portion can be arranged to be horizontal but can equally be constructed, for example, as an inclined surface over which the material rolls or slides downwards. The term "table" is intended to cover any design possibly performing other functions, and thus, for example, includes also a construction in the form of a roller conveyor, a surface with openings, or the like.

BRIEF DESCRIPTION OF THE DRAWINGS

Further features and details of the invention can be found in the following description of an embodiment with reference to the drawing.

DETAILED DESCRIPTION

Figure 1:
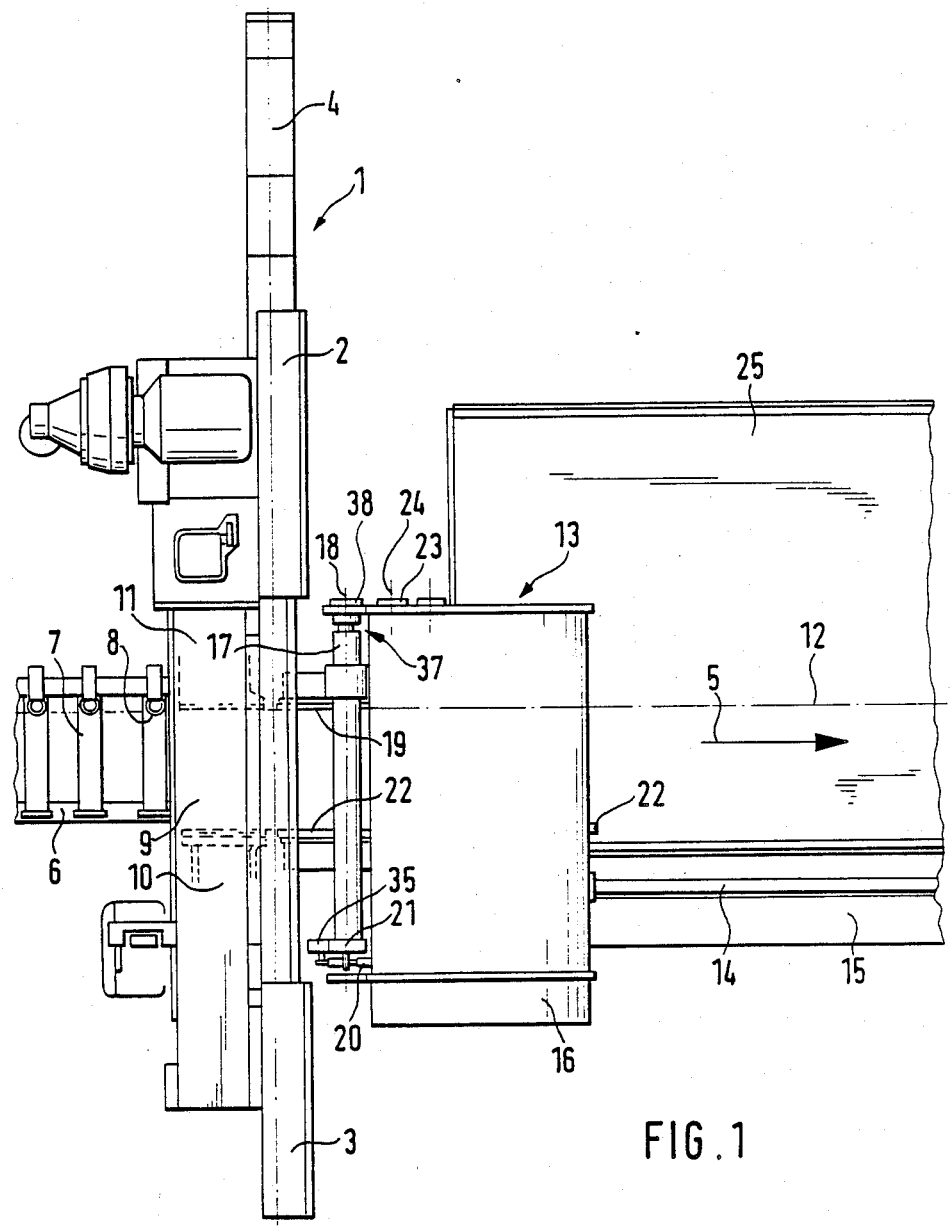
FIG. 1 shows a top plan view of a cutting machine having an advancing device.

FIG. 1, as viewed from above, shows a horizontal band saw machine 1 guided over the pulleys 2 and 3 of which the saw band (not shown) travels, the saw band penetrating along the cutting plane 4 the rod-shaped workpiece material (also not shown), the advance direction of which is indicated by the arrow 5. Along this advance direction, the material is conveyed via a feed device 6, which in this case is a roller conveyor having horizontal rollers 7 and vertical rollers 8, to the table 9 of the cutting machine 1 where it can be clamped by clamping jaws 10, 11. The clamping jaw 11 is immovably arranged at a vertical boundary plane 12 for the material which is formed also by the vertical rollers 8, while the clamping jaw 10 can be displaced transversely to the advance direction 5 in order to open and close the pair of clamping jaws 10, 11. The pair of clamping jaws 10, 11 are arranged relative to the advance direction 5 of the material exclusively in front of and at some distance from the cutting plane 4.

Essentially on the right-hand side of the cutting plane 4, a carriage 13 can be displaced along a guideway, formed by a rod 14 and a profile 15, parallel to the advance direction 5 by means of a drive means (which is not shown in detail, as it is known) the essentially visible housing 16 of the carriage 13 carries a rotatably mounted shaft 17 that extends transversely to the advance direction 5 and has an axis 18. An advancing jaw 19 is attached to the shaft 17 in such a manner that it can be pivoted by the shaft, the clamping surface of this jaw 19 lying in the plane 12. The pivotal movement of the advancing jaw 19 is effected by a cylinder piston unit of which the piston rod 20 engages eccentrically on a lever 21, which is likewise seated on the shaft 17.

Opposite the advancing jaw 19 there is arranged an advancing jaw 22 which, inter alia, can be displaced transversely to the advance direction 5 on a rod 23, which is likewise mounted in the housing 16 and has an axis 24, in such a manner that the workpiece (not shown) can be clamped between the advancing jaws 19 and 22. In order to advance the workpiece material in the direction of the arrow 5, the advancing jaws 19 and 22 can be displaced beyond the cutting plane 4, to the left in the drawing, until they are directly adjacent to the jaws 10, 11 where they can grasp the piece of material, which, after a cut has been made, projects beyond the jaws 10, 11, and thus advance or pull the entire material rod to the right by an amount corresponding to the next piece to be cut off.

During the cutting operation, the piece of material to be cut off can be held close to the cutting plane by the advancing jaws 19, 22, the advancing jaws advantageously being adjusted to lie at the middle, measured lengthwise, of the piece of material to be cut off and in that case therefore being located further to the right than in the drawing. When the piece of material has been cut off, the advancing jaw 19 is pivoted upwards relative to the support table 25 for the material to such an extent that the severed piece of material can be pushed out sideways by the advancing jaw 22, that is to say upwards in the drawing, and therefore transversely to the advance direction 5, out of the region of the carriage 13.

Figure 2:
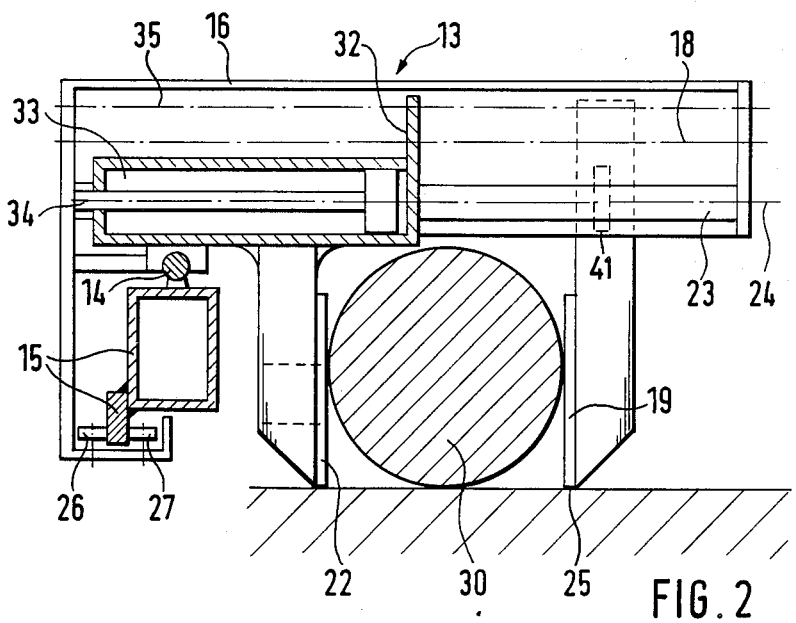
FIG. 2 shows an end view, partly in section, of the advancing device having a workpiece clamped in it.

FIG. 2 shows a schematic view of the carriage 13 seen from the right looking towards the left in FIG. 1. This figure shows the carriage housing 16 which is arranged in such a manner that it is guided in sliding manner on the rod 14 and via rollers 26, 27 on the profile 15; the profile 15 can additionally have a toothed rack by means of which the advance drive of the carriage 13 can be effected by means of a motor (not shown).

Figure 3:
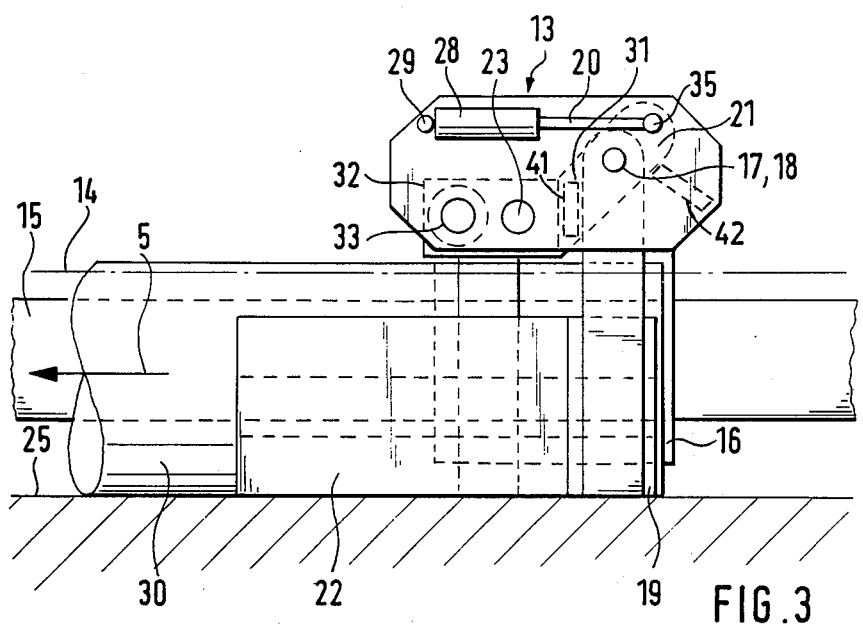
FIG. 3 shows a side view of the advancing device according to FIG. 2.

FIG. 2 also shows the axis 18 about which the advancing jaw 19 can be pivoted by means of the piston rod 20 of the cylinder piston unit 28 (see FIG. 3). The cylinder piston unit 28 is at the other end articulated on the housing 16 at point 29. Adjustable stops 41 and 42 are provided between which the second jaw can be pivoted.

On the other side of the material rod 30 shown in FIGS. 2 and 3, there is arranged the transversely movable advancing jaw 22 which can be displaced along the axis 18 on the rod 17 with an extension piece 31 of a guide part 32 and also, in the manner already described with reference to FIG. 1, on the rod 23 having the axis 24. Adjacent to this axis 23 there is arranged in parallel, transversely with respect to the advance direction 5, a cylinder piston unit 33 of which the cylinder is connected to the advancing jaw 22, while the piston rod 34 thereof is attached to the housing 6. As will be very clear from FIG. 3, although it cannot be seen behind the material rod 30, the advancing jaw 22 is extended away from the cutting plane in the advance direction 5 of the material 30, in order to provide tilt-free contact surface, especially for the aforementioned transverse movement of the severed piece of material.

It should also be mentioned in connection with FIGS. 2 and 3 that the reference numeral 35 indicates the axis about which the piston rod 20 of the cylinder piston unit 28 is rotatably applied to the lever 21.

Figure 4:
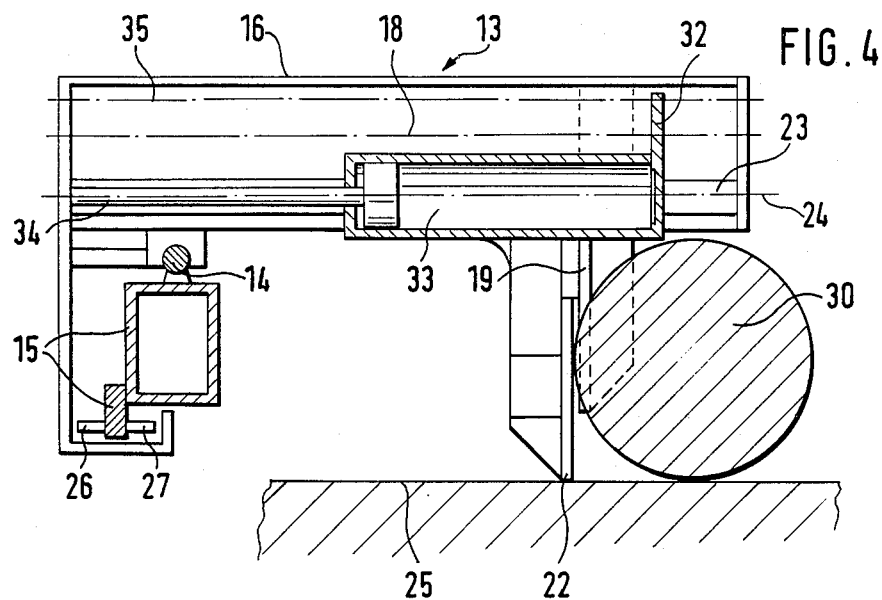
FIG. 4 shows the advancing device viewed as in FIG. 2 with the work piece being discharged.
Figure 5:
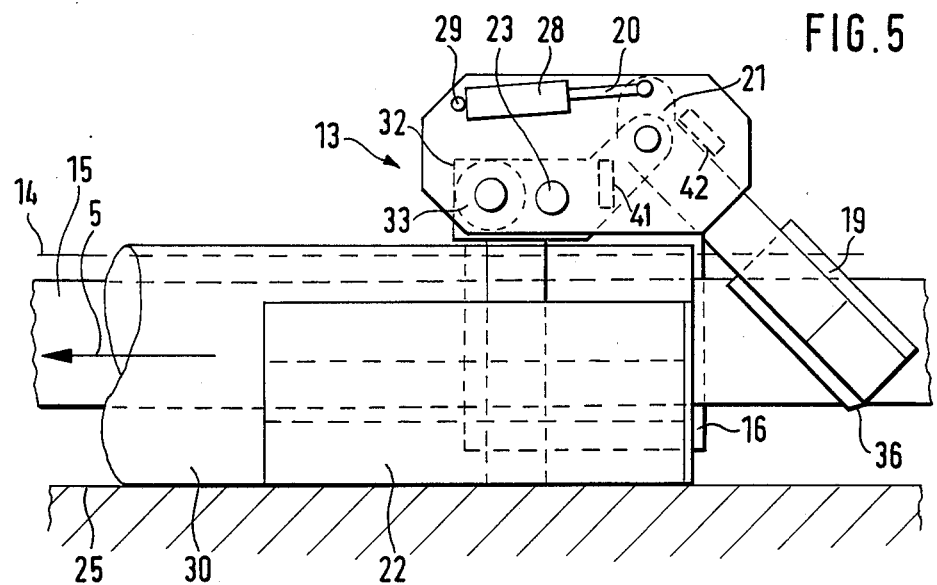
FIG. 5 shows a side view, as in FIG. 3, of the advancing device according to FIG. 4.

FIGS. 4 and 5 show the advancing device of FIGS. 2 and 3, viewed in the same manner, it being necessary to point out that the views shown in FIGS. 3 and 5 are the views from the right of the subject in FIGS. 2 and 4, respectively.

As can be seen from FIGS. 4 and 5, the advancing jaw 19 can be pivoted away sideways and upwards out of the transverse displacement region of the severed piece of material 30 by suitable operation of the cylinder piston unit 28, so that this piece of material can be displaced by the advancing jaw 22 transversely to the advance direction 5 on the support table 25 until it passes out of the range of displacement of the advancing jaws 19, 22 in the advance direction 5. FIG. 4 shows this operation at an intermediate stage from which the material 30 is still to be displaced further to the right on the support table 25 by an amount corresponding to the width of the advancing jaw 19.

As can be seen especially from FIG. 5, the advancing jaw 19 has a bevel 36 in order that a collision with the support table 25 is avoided during the pivotal movement. In addition, in the manner already described at the beginning, the advancing jaw 19 can, for example, be displaced to the left from the position shown in FIGS. 2 and 4 by a small amount, so that it comes to rest in the path of the material 30 along the plane 12 and can there act as a stop for a freshly inserted material rod. This short adjusting movement by the amount shown by the reference numeral 37 in FIG. 1 can be effected by axial displacement of the shaft 17 with the aid of a terminal, double-acting cylinder piston unit 38 designed to have a short stroke. This short adjusting movement has no disadvantageous effect on the articulation of the piston rod 20 on the lever 21, since the mutual play of the mentioned parts and of the piston rod 20 in the piston cylinder unit 28 is sufficient for this movement.

Figure 6:
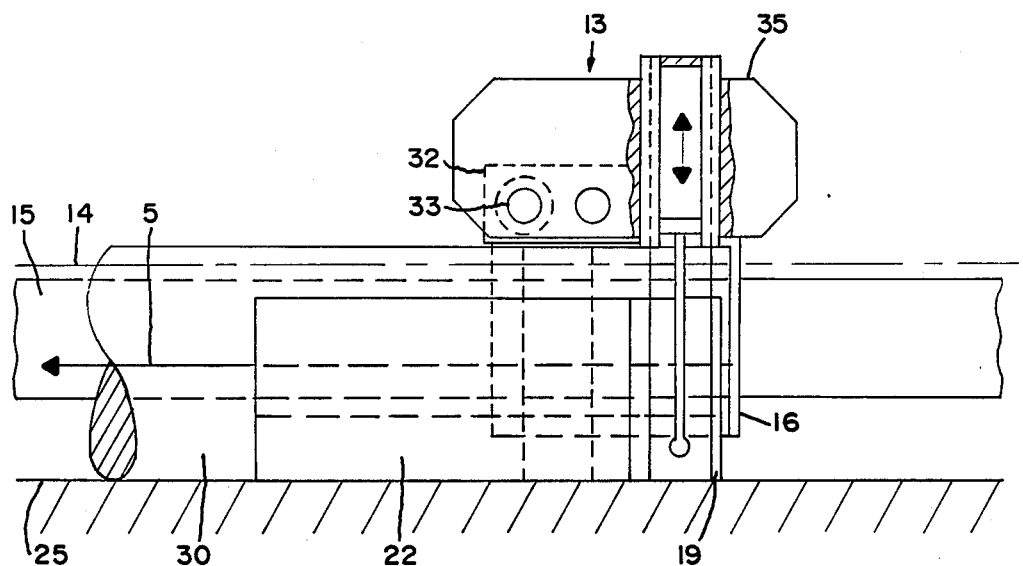
FIG. 6 is a side view of a modified device which shows means for vertically displacing the second clamping jaw.
Figure 7:
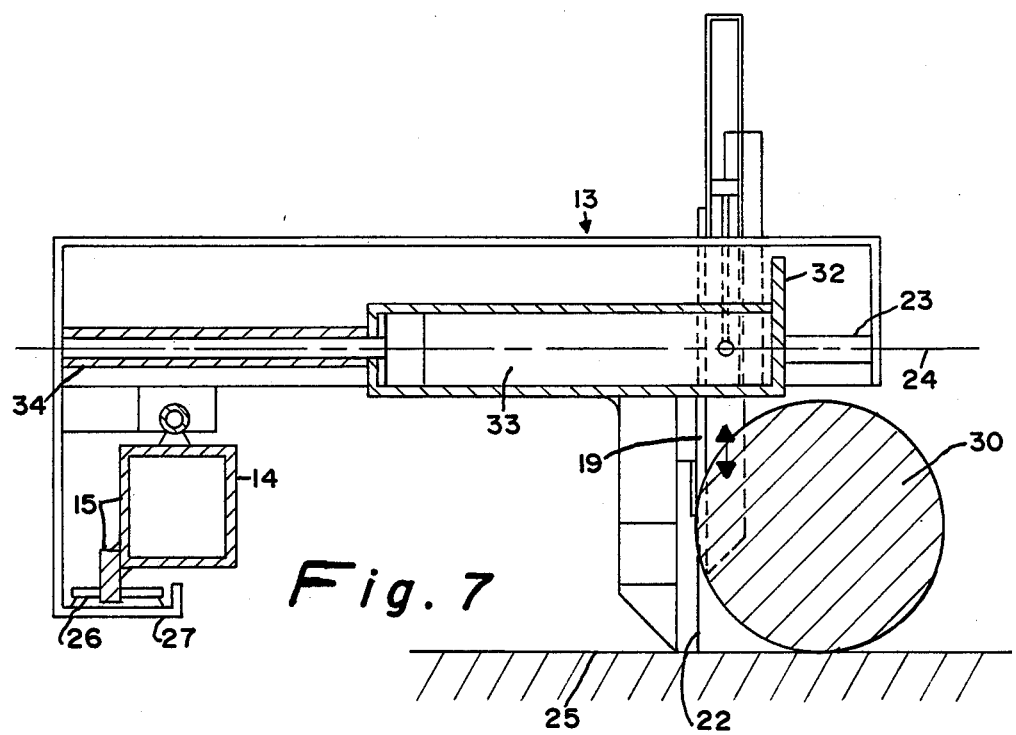
FIG. 7 is an end view of the device shown in FIG. 6.

FIGS. 6 and 7 illustrate a modification illustrating guide rails 43 along which the second advancing jaw is guided to move the jaw out of the movement of the cut material by the first jaw.

Figure 8:
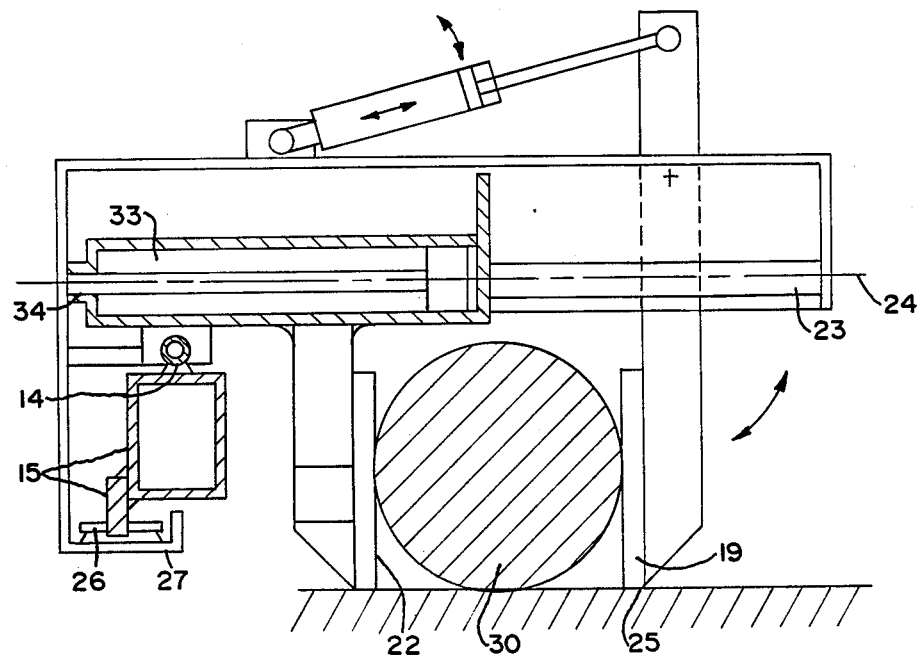
FIGS. 8 and 9 show a further modification illustrating a piston for displacing the second clamping jaw.
Figure 9:
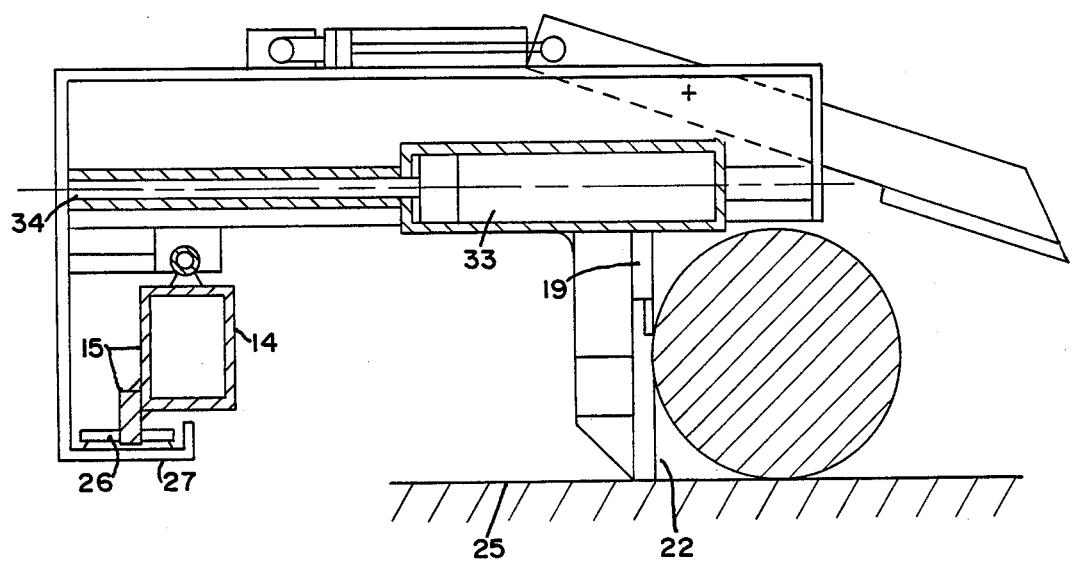

FIGS. 8 and 9 illustrate a further modification in which the second jaw is swivelled about an axis 44 parallel to the material advance direction by use of a piston 45 and cylinder 46.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States:

1. Device for advancing a workpiece of material to a cutting station in a cutting machine including a saw means for cutting a desired length of material, advancing the material to a deposition station and discharging a cut piece of material at the deposition station; which comprises a first table for supporting the material during the cutting operation, at least one pair of clamping jaws that can be opened and closed for holding the material during cutting, said at least one pair of clamping jaws being arranged in front of a cutting plane in the material advance direction, feed means for advancing the workpiece of material to its cutting position when said at least one pair of claimping jaws are open, first and second advancing jaws arranged in a material advance direction relative to said clamping jaws, movable means for transversely moving said first advancing jaw for the purpose of opening and closing upon a cut piece of material, support means for moving said advancing jaws and the cut piece of material in the material advance direction to a deposition station, adjustable means for moving said second advancing jaw out of a path in the advancing direction of the material, and said movable means advances transversely to move said first advancing jaw beyond the adjusted position of said second advancing jaw to displace the cut piece of material transverse to the advance direction of the material at said deposition station.

2. Device according to claim 1, in which said second advancing jaw is displaceably arranged on vertical guides.

3. Device according to claim 1, in which said second advancing jaw can be swivelled about an axis arranged transversely with respect to the material advance direction.

4. Device according to claim 1, in which said second advancing jaw can be swivelled about an axis arranged parallel to the material advance direction.

5. Device according to claim 1, which comprises a carriage upon which said first and second advancing jaws are displaceably arranged, said carriage extends above and across the material advance path, means for displacing said carriage along a guideway that extends parallel to the material advance direction said guideway being arranged on a side of said transversely movable advancing jaw remote from the material.

6. Device according to claim 1, in which a clamping surface of said transversely movable advancing jaw is extended in the material advance direction away from the cutting plane.

7. Device according to claim 1, in which said second advancing jaw can be displaced into the material advance path by a small amount transverse to the material advance direction.

8. Device according to claim 1, in which said first and second advancing jaws are displaced on said carriage hydraulically by means of cylinder piston units.

9. Device according to claim 1, characterized in that, after the material advance, the advancing jaws (19, 22,) can be returned to the middle of the material (30) to be cut off and can there be clamped onto the material.

10. Device according to claim 1, which includes a second support table for the material, said first table adjoins said second table in the material advance direction and is widened at least by an amount corresponding to an amount by which the cut material can be displaced transversely by means of the transversely movable first advancing jaw.

11. Device according to claim 3, in which said second advancing jaw can be pivoted between adjustable stops.

12. Device according to claim 3, in which said second advancing jaw can be swivelled upwards.

13. Device according to claim 3, which comprises a carriage upon which said first and second advancing jaws are displaceably arranged, said carriage extends above and across the material advance path, means for displacing said carriage along a guideway that extends parallel to the material advance direction said guideway being arranged on a side of said transversely movable advancing jaw remote from the material.

14. Device according to claim 3, in which a clamping surface of said transversely movable advancing jaw is extended in the material advance direction away from the cutting plane.

15. Device according to claim 3, in which said second advancing jaw can be displaced into the material advance path by a small amount transverse to the material advance direction.

16. Device according to claim 3, in which said first and second advancing jaws are displaced on said carriage hydraulically by means of cylinder piston units.

17. Device according to claim 3, characterized in that, after the material advance, the advancing jaws (19, 22,) can be returned to the middle of the material (30) to be cut off and can there be clamped onto the material.

18. Device according to claim 3, which includes a second support table for the material, said first table adjoins said second table in the material advance direction and is widened at least by an amount corresponding to an amount by which the cut material can be displaced transversely by means of the transversely movable first advancing jaw.

19. Device according to claim 4, in which said second advancing jaw can be pivoted between adjustable stops.

20. Device according to claim 4, in which said second advancing jaw can be swivelled upwards.

21. Device according to claim 4, which comprises a carriage upon which said first and second advancing jaws are displaceably arranged, said carriage extends above and across the material advance path, means for displacing said carriage along a guideway that extends parallel to the material advance direction said guideway being arranged on a side of said transversely movable advancing jaw remote from the material.

22. Device according to claim 4, in which a clamping surface of said transversely movable advancing jaw is extended in the material advance direction away from the cutting plane.

23. Device according to claim 4, in which said second advancing jaw can be displaced into the material advance path by a small amount transverse to the material advance direction.

24. Device according to claim 4, in which said first and second advancing jaws are displaced on said carriage hydraulically by means of cylinder piston units.

25. Device according to claim 4, characterized in that, after the material advance, the advancing jaws (19, 22,) can be returned to the middle of the material (30) to be cut off and can there be clamped onto the material.

26. Device according to claim 4, which includes a second support table for the material, said first table adjoins said second table in the material advance direction and is widened at least by an amount corresponding to an amount by which the cut material can be displaced transversely by means of the transversely movable first advancing jaw.

* * * * *